United States Patent
Schreiber et al.

(10) Patent No.: US 12,228,200 B2
(45) Date of Patent: Feb. 18, 2025

(54) COAXIAL TRANSMISSION WITH PLAIN BEARING

(71) Applicant: WITTENSTEIN SE, Igersheim (DE)

(72) Inventors: Heiko Schreiber, Doberschau (DE); Michael Schmidt, Reichenberg (DE); Thomas Bayer, Igersheim (DE)

(73) Assignee: WITTENSTEIN SE, Igersheim (DE)

( * ) Notice: Subject to any disclaimer, the term of this patent is extended or adjusted under 35 U.S.C. 154(b) by 0 days.

(21) Appl. No.: 18/030,395

(22) PCT Filed: Oct. 5, 2021

(86) PCT No.: PCT/EP2021/077411
§ 371 (c)(1),
(2) Date: Apr. 5, 2023

(87) PCT Pub. No.: WO2022/073984
PCT Pub. Date: Apr. 14, 2022

(65) Prior Publication Data
US 2023/0375083 A1    Nov. 23, 2023

(30) Foreign Application Priority Data
Oct. 6, 2020 (DE) .......................... 102020126103.9

(51) Int. Cl.
*F16H 55/08*    (2006.01)
*F16H 1/10*    (2006.01)
*F16H 57/021*    (2012.01)

(52) U.S. Cl.
CPC ............. *F16H 55/088* (2013.01); *F16H 1/10* (2013.01); *F16H 57/021* (2013.01)

(58) Field of Classification Search
CPC ................................. F16H 55/088; F16H 1/10
See application file for complete search history.

(56) References Cited

U.S. PATENT DOCUMENTS

| | | | |
|---|---|---|---|
| 4,798,104 A * | 1/1989 | Chen ....................... | F16H 25/06 475/159 |
| 8,307,738 B2 * | 11/2012 | Schmidt .................. | F16H 25/06 74/640 |
| 2016/0298747 A1 * | 10/2016 | Schreiber ............. | F16H 49/001 |

FOREIGN PATENT DOCUMENTS

| | | |
|---|---|---|
| DE | 102006042786 A1 | 3/2008 |
| DE | 102007011175 A1 | 9/2008 |

(Continued)

OTHER PUBLICATIONS

Grote et al., Dubbel: Taschenbuch für den Maschinenbau, 22nd Edition, Berlin, Heidelberg, Springer, 2007, S. G74, G89, ISBN 978-3-540-49714-1.

(Continued)

*Primary Examiner* — Vicky A Johnson
(74) *Attorney, Agent, or Firm* — Bachman & LaPointe, P.C.

(57) ABSTRACT

Gearbox (1) having a tooth carrier (40) for receiving teeth (7) of a gear ring that are disposed about a rotation axis (5) of the gearbox, wherein the teeth (7) are disposed in the tooth carrier (11) so as to be displaceable and guided in the radial direction, a cam disk (20) which is rotatable about the rotation axis (5) and for driving the teeth (7) in the radial direction has a cam curvature that is variable over the circumference, wherein bearing segments (24) which are mounted so as to slide on the cam disk (20) are disposed between the teeth (7) and the cam disk (20), and wherein the bearing segments (24) have a contact region which has a concave curvature and is disposed so as to be centric on a running surface that faces the cam disk (20), wherein the concave curvature is larger than the smallest cam curvature of the cam disk, and smaller than the largest cam curvature of the cam disk.

17 Claims, 2 Drawing Sheets

(56) References Cited

FOREIGN PATENT DOCUMENTS

DE   102012104083 A1   11/2013
DE   102015105525 A1   10/2016

OTHER PUBLICATIONS

International Preliminary Report on Patentability and Written Opinion Dated Mar. 28, 2023 for corresponding application PCT/EP2021/077411.
International Search Report and Written Opinion Dated Dec. 10, 2021 for corresponding application PCT/EP2021/077411.

\* cited by examiner

COAXIAL TRANSMISSION WITH PLAIN BEARING

FIELD OF THE INVENTION

The invention relates to a gearbox and to a method for operating a gearbox.

PRIOR ART

Gearboxes that comprise teeth which are mounted so as to be radially displaceable in a tooth carrier are known from the prior art. Drive elements with a profiled feature, such as cam disks, for example, are used for driving the teeth. The teeth engage in internal teeth of a toothing such that a relative movement between the tooth carrier with the teeth and the toothing occurs. Here, the relative movement between the toothing and the teeth is smaller than the movement of the drive element with the profiled feature by at least one magnitude. High gearing ratios can be achieved in this way.

In these gearboxes, the mounting of the teeth on the cam disk is a critical issue. For this purpose, solutions from the prior art to date use a so-called segmented mounting with bearing segments, see DE 10 2015 105525 A1, for example. However, the construction using rolling bearings below the bearing segments is complex.

SUMMARY OF THE INVENTION

It is an object of the invention to specify gearboxes that are improved in comparison to gearboxes known from the prior art, the intention being to achieve less friction in association with a simple construction. It is furthermore an object of the invention to specify a method for operating such a gearbox.

The object is achieved by a gearbox as disclosed herein, and by a method for operating a gearbox as disclosed herein. Advantageous refinements and embodiments are derived from the dependent claims and from this description.

One aspect of the invention relates to a gearbox, in particular a coaxial gearbox, having a tooth carrier for receiving teeth of a gear ring that are disposed about a rotation axis of the gearbox, wherein the teeth are disposed in the tooth carrier so as to be displaceable and guided in the radial direction, a cam disk which is rotatable about the rotation axis and for driving the teeth in the radial direction has a cam curvature that is variable over the circumference, wherein bearing segments which are mounted so as to slide on the cam disk are disposed between the teeth and the cam disk, and wherein the bearing segments have a contact region which has a concave curvature and is disposed so as to be centric on a running surface that faces the cam disk, wherein the concave curvature is larger than the smallest cam curvature of the cam disk, and smaller than the largest cam curvature of the cam disk.

A further aspect of the invention relates to a method for operating a gearbox in one of the typical embodiments described herein.

When comparing curvatures, as is set forth herein for various ranges, the absolute values of the curvatures are generally compared. The cam curvature of the cam disk is typically convex over the entire circumference, in any case at least in typical embodiments is not concave over the entire circumference.

The bearing segments are typically mounted so as to slide on the cam disk. In particular, the bearing segments are mounted directly on the cam disk, meaning in particular only separated by a lubricating film. In typical embodiments, the bearing segments are not magnetic, or are composed of a non-magnetizable material. The bearing segments and the cam disk are typically made from materials which do not build up any magnetic forces, or at least not any substantial magnetic forces, between the cam disk and the bearing segments. A hydrodynamic mounting by plain bearing is in each case typically configured between the respective running surfaces of the bearing segments and the cam disk during the operation of the gearbox.

The concave curvature of the contact regions of the bearing segments in typical embodiments is constant at least in portions, or at least in a centric region of the respective contact region. In relation to the term curvature, it should be noted that this is to be understood as the degree of curvature of the relevant surface at the observed point. The curvature is typically defined by kappa: dphi/ds, thus angular variation over the arc length, or else 1/r.

It is to be taken into account here, for example, that the cam disk may have a certain axial width within which the cam disk has the same cross section, but has different curvatures in the circumferential direction along the circumference.

Embodiments of the invention relate in particular to coaxial gearboxes. The axial direction typically describes the longitudinal axis of the gearbox. An engagement of the teeth in the toothing of the ring gear typically describes the engagement of the teeth in the internal teeth of the toothing, the latter in typical embodiments lying on the constant pitch circle diameter.

The term "cam disk" is typically generally understood to mean that the corresponding component does not mandatorily have to be similar to a disk. Rather, the cam disk may also be part of a driveshaft or have an elongate extent, in particular having a plurality of portions. One or a plurality of such portions can have a variable radius such that the function of a cam disk is met. Further portions can have other functions and, for example, be cylindrical or else be provided with edges, for example for the transmission of torque. The term cam disk typically relates primarily to the function of this component, specifically of providing a revolving profiled feature so as to drive the teeth in the radial direction, depending on the angular position of the driveshaft and thus of the cam disk, or of permitting the teeth to slide back in the guides, for example.

The toothing is typically an encircling toothing. The internal teeth of the toothing engage with the teeth, wherein the teeth are typically mounted so as to be radially displaceable in a linear manner relative to the tooth carrier. "Radially linear" here usually means that there is a guide in the radial direction, said guiding permitting only a movement of the tooth in the radial direction. Typically, a tooth can be displaced in a linear manner in exactly one direction as a result of the guide, this can be achieved, for example, in that the tooth across a specific distance has a consistent cross-section in the displacement direction, wherein the tooth carrier likewise has an opening for the tooth, said opening having a consistent cross-section. The teeth are usually mounted in the tooth carrier so as to be in each case displaceable in exactly one direction, typically in the direction of the longitudinal axis of the tooth. In typical embodiments, the degree of freedom of rotation of the teeth relative to the tooth carrier about the longitudinal axis of the gearbox is furthermore blocked. This can be achieved, for example, by way of a linear guide of the teeth in the radial direction in the tooth carrier. In this way, the teeth, conjointly with the tooth carrier, rotate about the longitudinal axis of the gearbox, but not relative to the tooth carrier.

In typical embodiments of the gearboxes according to the invention, at least part of the teeth are embodied to be flexurally rigid. The term "flexurally rigid" here is typically to be understood in the technical sense, meaning that flexing of the teeth by virtue of the rigidity of the material of the teeth is so minor that said flexing is at least substantially irrelevant in terms of the kinematics of the gearbox. Flexurally rigid teeth comprise in particular teeth which are produced from a metal alloy, in particular steel, or a titanium alloy, a nickel alloy, or other alloys. Furthermore, flexurally rigid teeth made from plastics material can also be provided in particular in the case of gearboxes in which at least one of the following parts is likewise produced from plastics material: toothing on a ring gear or a gear wheel, tooth carrier and drive element. In typical embodiments of the invention, the tooth carrier and the teeth, or additionally also the toothing or furthermore additionally the drive element, are produced from a metal alloy. Such gearboxes offer the advantage that they have extreme torsional rigidity and a high load-bearing capability. Gearboxes which are at least partially composed of plastics material, or comprise components from plastics material, offer the advantage that they can have a low weight. The term "flexurally rigid" refers in particular to a flexural rigidity about a transverse axis of the tooth.

In typical embodiments, a bearing segment is disposed between the tooth and the cam disk, said bearing segment resting on the cam disk by means of a lubricating film during rotational operation. Advantageous embodiments comprise a bearing segment which is disposed between the cam disk and in each case at least one tooth. The bearing segment enables the tooth to tilt relative to the running surface of the cam disk, or relative to the bearing segment. At least two teeth are typically mounted on one bearing segment. In further embodiments, exactly one tooth, for example a round tooth or a flat tooth, is in each case mounted on one of the bearing segments. Flat teeth can be secured against twisting about their own axis in the tooth guide, round teeth typically so by a form-fit with the bearing segment. A plurality of teeth mounted on one bearing segment are typically disposed next to one another in one row in the axial direction. The smooth running of the bearing segments can be enhanced using such arrangements of a plurality of teeth, or using flat teeth.

Typical embodiments of the invention comprise a cam disk as a drive element. The cam disk preferably has a non-circular or a non-ellipsoidal arcuate shape or curve. The non-circular or non-ellipsoidal arcuate shape offers the advantage that different curves can be used, for example for setting different gearing ratios. In the context of this application, eccentrics are typically included in circular or ellipsoidal shapes because in the case of eccentrics only the rotation axis does not correspond to the central axis of the circular shape but there is nevertheless a circular shape. Typical cam disks comprise at least or exactly two peaks or elevations which are typically distributed uniformly over the circumference. The peaks may also be referred to as maxima. A plurality of peaks will bring more teeth to engage with the toothing. A typical cam disk which can be used in the invention can be derived from the gearbox Galaxie® G135, for example, which is available from WITTENSTEIN galaxie GmbH, 97999 Igersheim, Germany.

In typical embodiments, the tooth carrier or the toothing is configured to be circular. This offers the advantage of a simple geometry for the tooth carrier and the toothing. The transmission of force typically takes place on the slow side of the gearbox, between the toothing and the tooth carrier. This offers the advantage that the distance for the transmission of force is extremely short so that an extremely high rigidity can be achieved.

The internal teeth of the toothing and the teeth typically have curved flanks. In typical embodiments, internal teeth and teeth have in each case tooth crests which in terms of the cross section correspond to a cross section of a truncated pyramid, or of a pyramid, in each case having curved flanks. In terms of a potential embodiment of a curvature in the form of a logarithmic spiral, reference is made to DE 10 2007 011 175 A1. The curved surface offers the advantage that the engaging flanks are in planar contact rather than simply a linear or punctiform contact. In this way, a positive distribution of load among many teeth, and an extreme level of rigidity in the transmission of force between the toothing and the teeth, is achieved.

In typical embodiments, the concave curvature of the contact region of the bearing segment is larger than the convex cam curvature of the cam disk at the at least one trough of the cam disk. The at least one trough of the cam disk is distinguished by a minimum spacing of the running surface from the longitudinal axis. At this location, the cam disk typically has the smallest cam curvature, wherein the term "smallest cam curvature" of the cam disk in typical embodiments can also be understood such that the cam curvature at this location or else in the region about the trough can be equal to 0. The concave curvature of the bearing segments is typically smaller than the convex cam curvature of the cam disk in the at least one peak of the cam disk, thus where the spacing of the running surface from the longitudinal axis is typically at the maximum. The cam curvature of the cam disk is typically the largest in the region of the at least one peak. However, in further embodiments, the largest cam curvature may also be aside from the at least one peak.

The cam disk typically has exactly one peak having a maximum radial spacing from the rotation axis, and one trough having a minimum radial spacing from the rotation axis, wherein the concave curvature of the bearing segments is smaller than the smallest convex cam curvature within an angular range, proceeding from the peak, typically in both rotation directions, of 5% to 35% of the entire angular range of the cam disk. In typical embodiments having a cam disk with exactly one peak, the concave curvature is smaller than the smallest cam curvature within an angular range, proceeding from the peak, typically in both rotation directions, of 20° to 120°.

Typical embodiments have a cam disk having at least two peaks having a maximum radial spacing from the rotation axis, and at least two troughs which lie in each case between peaks and have a minimum radial spacing from the rotation axis, wherein the concave curvature of the bearing segment is smaller than the smallest cam curvature within an angular range, proceeding from a first one of the peaks, of 5% to 35% of the overall angular range, up to a second one of the peaks. In typical embodiments having a cam disk with two peaks, the concave curvature is smaller than the smallest cam curvature within an angular range, proceeding from the peak, typically in both rotation directions, of 10° to 60°. In further typical embodiments having three peaks, the concave curvature is smaller than the smallest cam curvature within an angular range, proceeding from the peak, typically in both rotation directions, of 6° to 40°.

The so-called engagement region of the teeth, thus the region in which the teeth engage in a force-transmitting manner with the internal toothing, on the one hand, and with the bearing segments, on the other hand, is at least substantially typically located in the specified angular range. Typical cam disks have in each case a symmetrical curved profile about the peaks and about the troughs.

The concave curvature is typically at most 0.2%, at most 0.5%, or at most 1%, smaller than the smallest cam curvature within the respective above-mentioned angular range, for example the 5% to 35%, or 20° to 120°, 10° to 60°, or 6° to 40°.

In typical embodiments, the running surface of the bearing segments in a peripheral region of the running surface is in each case curved convexly in the circumferential direction. The peripheral regions in the circumferential direction lie in each case in front of and behind the contact region having the concave curvature, and can directly adjoin the concave curvature, or be separated from the contact region by a plane. In turn, one flat sub-face can in each case be disposed so as to adjoin the convex peripheral regions in embodiments. In this way, in typical embodiments the following sequence results in the circumferential direction, proceeding from a center of the running surface: concave curvature of the contact region, convex curvature of the peripheral region, flat sub-face, and optionally a further convex curvature of the edge of the bearing segment. A buildup of a lubricating film can be assisted by way of this geometry. In further typical embodiments, the peripheral region is completely embodied with a very minor convex curvature.

The running surface of the bearing segments typically comprises a plane bearing material, for example bronze, brass or white metal, the wording "or" also comprising in each case "and/or" combinations. Alternatively or additionally, a coating of the running surface of the cam disk may be provided. In this way, pitting can be largely precluded so that a local failure of the lubricating film, or contact with individual particles, does not lead directly to the destruction of the bearing properties.

In typical embodiments, a bead having a tooth-bearing face is configured on a surface of the bearing segments that faces away from the cam disk, wherein the tooth-bearing face has a partially cylindrical shape of which the axis lies at least substantially in the region of the running surface. In this way, the pivot axis of the teeth on the running surface is displaced such that any migration of a pressure point, or any migration of the pressure point from the center of the bearing segments, is avoided. "Substantially in the region of the running surface" typically describes a region of at most 20% or at most 10% of the thickness in the radial direction of the bearing segments above or below the running surface.

The bearing segments in the revolving direction typically have in each case one straight front edge and one straight rear edge. This simplifies the construction.

Advantages of typical embodiments can be, inter alia, a longer service life, increased damping, or a higher load-bearing capability, in particular in output ranges with approximately consistently high rotating speeds.

BRIEF DESCRIPTION OF THE DRAWINGS

The invention will be explained in more detail hereunder by means of the appended drawings; in the figures.

DETAILED DESCRIPTION

Typical embodiments of the invention will be described hereunder by means of the figures, the invention not being limited to the exemplary embodiments, the scope of the invention rather being determined by the claims. In the description of the embodiment, in different figures and for different embodiments the same reference signs are at times used for identical or similar parts in order to improve the clarity of the description. However, this does not mean that corresponding parts of the invention are limited to the variants illustrated in the embodiments.

Figure 1:
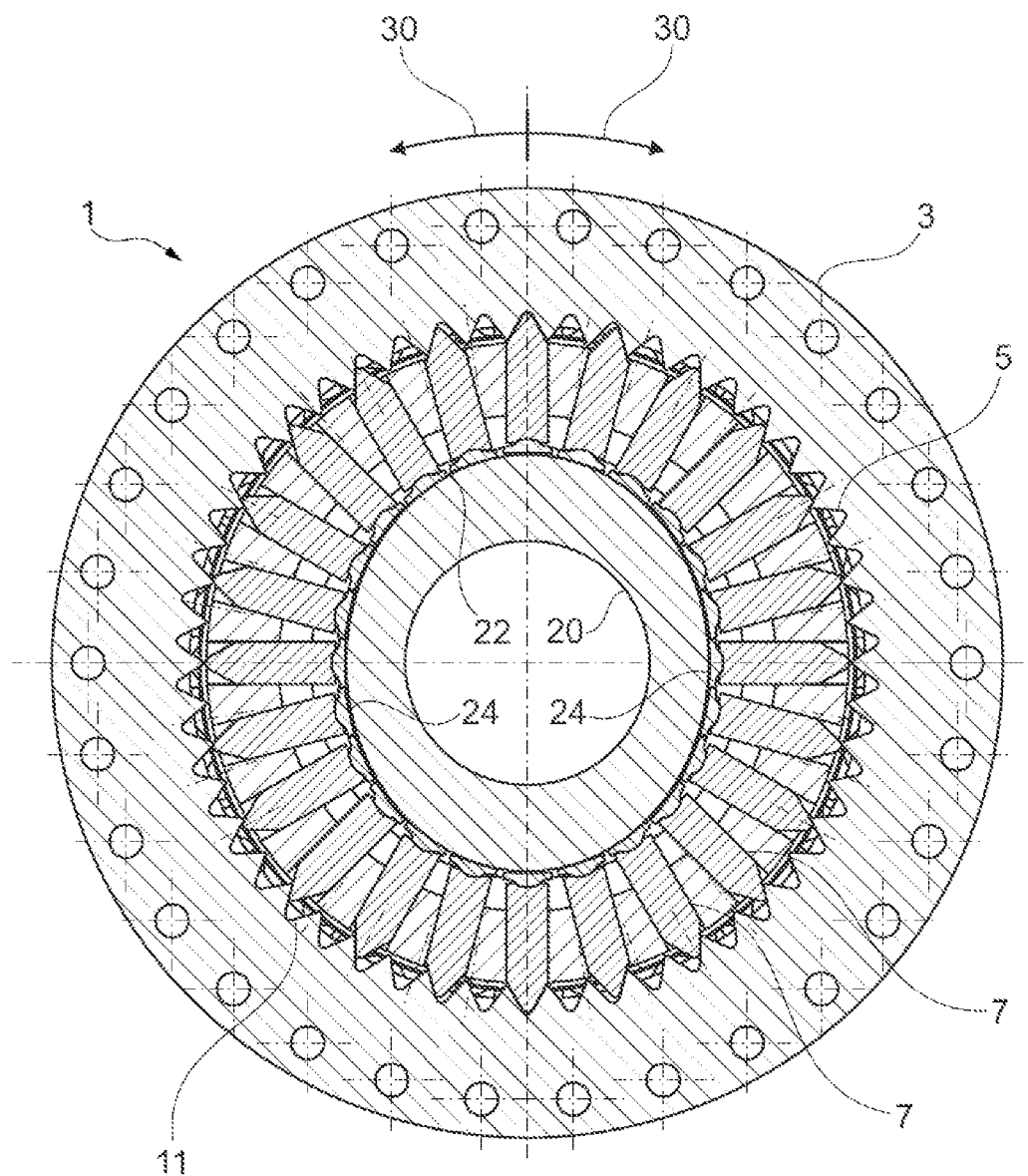
FIG. 1 schematically shows a first embodiment of the invention in a sectional view.

An exemplary embodiment is shown in a schematic sectional view in FIG. 1. FIG. 1 schematically shows a section through a gearbox 1 which has a ring gear 3 having an internal encircling toothing 5. Teeth 7 engage in the toothing 5. For improved clarity, not each tooth 7 of FIG. 1 is provided with the reference sign 7. This also applies to other parts of FIG. 1 which are present multiple times and are likewise not all provided with the respective reference sign. Two axially parallel gear rings are typically provided with individual teeth 7.

The teeth 7 are mounted so as to be radially displaceable in a tooth carrier 11. To this end, the tooth carrier 11 has radially aligned round openings in the manner of ducts, or openings in the manner of slots, which guarantee radial guiding of the teeth 7 in the tooth carrier 11. By virtue of radial guiding in the openings, the teeth 7 are able to move only in the radial direction along their longitudinal axis. Twisting relative to the tooth carrier 11 about a longitudinal axis of the gearbox 1 is in particular precluded.

The longitudinal axis of the teeth typically describes the axis running from the tooth root to the tooth crest, while the longitudinal axis of the gearbox points in the direction of the rotation axis of the gearbox. This can be, for example, the rotation axis of the tooth carrier which can be used as the output, or else the rotation axis of a cam disk.

The teeth 7 are driven by a drive element in the form of a cam disk 20 which is embodied as a hollow cam disk 20. The cam disk 20 has a profiled feature 22 for driving the teeth 7 in the radial direction. The profiled feature 22 has a profile having two peaks over the circumference such that respective opposite teeth 7 have entered the tooth gaps of the toothing 5 to the greatest extent (top and bottom in FIG. 1).

The peaks of the profiled feature 22 of the cam disk 20 that have the largest radius about the rotation axis in the center are at the top and bottom in FIG. 1, whereas the troughs having the smallest radius in FIG. 1 are in each case disposed on the right and the left of the cam disk, and so as to be rotated about 90° in relation to the peaks.

In gearbox 1 illustrated in FIG. 1, the teeth 7 are disposed on the profiled feature 22 of the cam disk 20 by way of a mounting by plain bearing. The mounting by plain bearing comprises bearing segments 24 which slide on the profiled feature 22 by means of a lubricating film (not illustrated). A hydrodynamic mounting 35 by plain bearing is in each case typically configured between the respective running surfaces of the bearing segments and the cam disk during the operation of the gearbox.

In the exemplary embodiment of FIG. 1, the output is taken from the tooth carrier, wherein the ring gear is fixedly established by the toothing.

The bearing segments 24 on the side that faces the tooth 7 have in each case one round tooth-bearing face which in portions is in particular cylindrical (cf. also FIG. 2) and forms a bead 31 on which the root of a tooth 7, or in typical embodiments two, three or four teeth, can be disposed next to one another in the axial direction of the gearbox 1. The bead 31, conjointly with a corresponding clearance in the tooth root of the respective tooth 7, prevents the tooth 7 from slipping on the bearing segment 24.

Root articulations for the teeth 7 are in each case configured by the beads 31, so that the teeth 7 can tilt relative to the bearing segments 24 in order to guarantee unconstrained guiding. The bead 31 on the radially outer side of the bearing segments 24, the former engaging in each case in grooves of the teeth 7, is disposed so as to be centric relative to the respective bearing segment 24. In this way, a centric transmission of force by the bearing segment 24 is achieved.

The bearing segments 24 in the revolving direction have straight front 33 and rear 34 edges and are mutually displaceable in the revolving direction so that the spacings between the bearing segments 24 can be varied as a function of the position of the teeth. This enables largely unconstrained guiding and largely unconstrained radial driving of the bearing segments 24 by the profiled feature 22 of the cam disk 20. In order for the frictional resistance between the profiled feature 22 and the bearing segments 24 to be minimized, or in order to ensure the lubricating film, respectively, those sides of the bearing segments 24 that face the cam disk have typical shapes which will be described by way of example hereunder.

The bead on the radially outer side of the bearing segments 24, the former engaging in each case in grooves of the teeth 7, is disposed so as be centric relative to the respective bearing segment 24. A centric transmission of force by the bearing segment 24 is achieved in this way.

Figure 2:
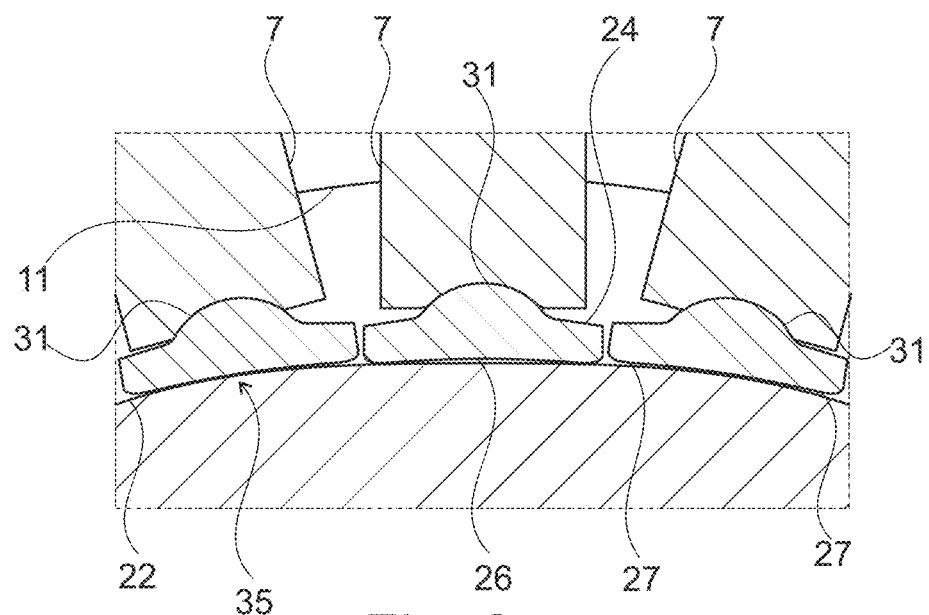
FIG. 2 schematically shows a detail of the embodiment of FIG. 1.

Three of the bearing segments 24 are illustrated in more detail in FIG. 2. The shape of the running surface that faces the cam disk will be explained in more detail in particular by means of the central one of the three bearing segments 24 of FIG. 2, said shape of the running surface having the contact region 26 disposed so as to be centric in the running surface. The contact region 26 has a concave curvature, wherein the concave curvature is larger than the smallest convex cam curvature of the cam disk, and smaller than the largest convex cam curvature of the cam disk. The concave curvature is at least 50% larger than the smallest convex cam curvature of the cam disk, in particular of the cam curvature in the trough.

The cam curvature of the cam disk 20 describes in each case the cam curvature of the profiled feature 22 at a specific location.

Proceeding from the elevation illustrated above in the figure, two angles 30 which are utilized for specifying the curvature of the running surface 26 of the bearing segment in more detail are plotted in FIG. 1. The concave curvature of the contact region 26 is constant over the region of the contact region 26 and is smaller than the smallest cam curvature within an angular range of 10° to 60° in both rotation directions, proceeding from the peak, typically at most 0.2% smaller than the smallest cam curvature within the angular range. More specifically, the concave curvature of the contact region is 99.8% of the smallest cam curvature between 10° and 60°. It is to be noted that the cam disk is typically of a symmetrical design.

Figure 3:
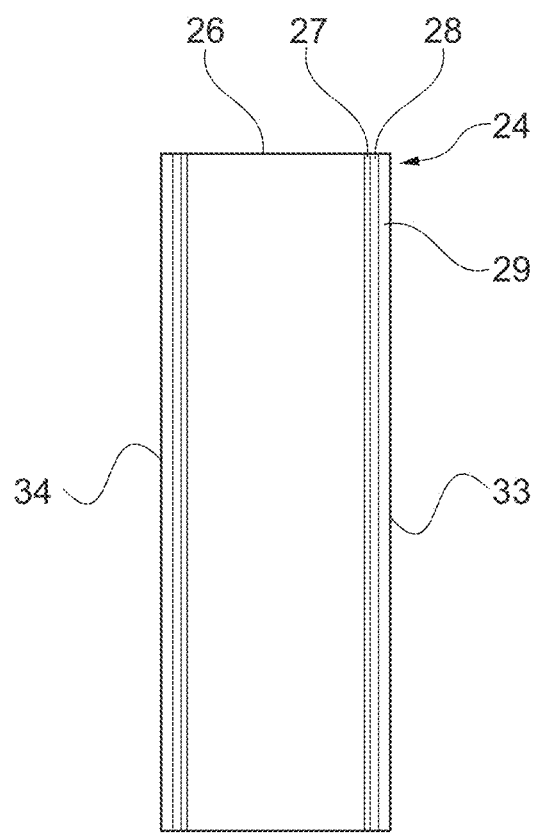
FIG. 3 schematically shows a bearing segment of the embodiment of FIG. 1 in a top view.

The side of one of the bearing segments 24 that faces the cam disk is shown in more detail in a schematic view in FIG. 3. One peripheral region 27 of the running surface adjoins in each case on either side of the centric contact region 26, said peripheral region 27 being convexly configured. Adjoining thereto is in turn provided a flat sub-face 28, which is then in each case adjoined by a convexly radiused edge 29 of the bearing segment 24. This shaping can also be schematically derived from FIG. 2; however, the corresponding regions in FIG. 2 are not provided with reference signs for improved clarity.

The invention claimed is:

1. Gearbox having
a tooth carrier for receiving teeth of a gear ring that are disposed about a rotation axis of the gearbox, wherein the teeth are disposed in the tooth carrier so as to be displaceable and guided in the radial direction,
a cam disk which is rotatable about the rotation axis and for driving the teeth in the radial direction and which has a cam curvature that is variable over the circumference,
wherein bearing segments which are mounted so as to slide on the cam disk are disposed between the teeth and the cam disk, and
wherein the bearing segments have a contact region which has a concave curvature and is disposed so as to be centric on a running surface that faces the cam disk, wherein the concave curvature is larger than the smallest cam curvature of the cam disk and smaller than the largest cam curvature of the cam disk, and
wherein the cam disk has at least two peaks having a maximum radial spacing from the rotation axis, and at least two troughs which lie in each case between peaks and have a minimal radial spacing from the rotation axis, and wherein the concave curvature is smaller than the smallest cam curvature within an angular range, proceeding from a first one of the peaks, of 5% to 35% of the overall angular range, up to a second one of the peaks.

2. Gearbox according to claim 1, wherein the concave curvature is at most 1% smaller than the smallest cam curvature within the angular range of 5% to 35%.

3. Gearbox according to claim 1, wherein the running surface of the bearing segments in a peripheral region of the running surface is in each case curved convexly in the circumferential direction.

4. Gearbox according to claim 3, wherein the convex peripheral region is disposed between the contact region and a flat sub-face.

5. Gearbox according to claim 1, wherein the running surface of the bearing segments comprises a plain bearing material.

6. Gearbox according to claim 1, wherein a bead having a tooth-bearing face is in each case configured on a surface of the bearing segments that faces away from the cam disk, wherein the tooth-bearing face has a partially cylindrical shape of which the axis lies at least substantially in the region of the running surface.

7. Gearbox according to claim 1, wherein the bearing segments, when viewed in the revolving direction, have in each case one straight front edge and one straight rear edge.

8. Gearbox according to claim 1, wherein a hydrodynamic mounting by plain bearing is in each case configured between the running surfaces of the bearing segments and the cam disk during the operation of the gearbox.

9. Gearbox having
a tooth carrier for receiving teeth of a gear ring that are disposed about a rotation axis of the gearbox, wherein the teeth are disposed in the tooth carrier so as to be displaceable and guided in the radial direction, a cam disk which is rotatable about the rotation axis and for driving the teeth in the radial direction and which has a cam curvature that is variable over the circumference, wherein bearing segments which are mounted so as to slide on the cam disk are disposed between the teeth and the cam disk, wherein the bearing segments have a contact region which has a concave curvature and is disposed so as to be centric on a running surface that faces the cam disk, wherein the concave curvature is larger than the smallest cam curvature of the cam disk and smaller than the largest cam curvature of the cam disk, and wherein the cam disk has exactly one peak having a maximum radial spacing from the rotation axis, and exactly one trough having a minimum radial spacing from the rotation axis, and wherein the concave curvature is smaller than the smallest cam curvature within an angular range, proceeding from the peak, of 5% to 35% of the overall angular range of the cam disk.

10. Gearbox according to claim 9, wherein the concave curvature is at most 1% smaller than the smallest cam curvature within the angular range of 5% to 35%.

11. Gearbox according to claim 9, wherein the running surface of the bearing segments in a peripheral region of the running surface is in each case curved convexly in the circumferential direction.

12. Gearbox according to claim 11, wherein the convex peripheral region is disposed between the contact region and a flat sub-face.

13. Gearbox according to claim 9, wherein the running surface of the bearing segments comprises a plain bearing material.

14. Gearbox according to claim 9, wherein a bead having a tooth-bearing face is in each case configured on a surface of the bearing segments that faces away from the cam disk, wherein the tooth-bearing face has a partially cylindrical shape of which the axis lies at least substantially in the region of the running surface.

15. Gearbox according to claim 9, wherein the bearing segments, when viewed in the revolving direction, have in each case one straight front edge and one straight rear edge.

16. Gearbox according to claim 9, wherein a hydrodynamic mounting by plain bearing is in each case configured between the running surfaces of the bearing segments and the cam disk during the operation of the gearbox.

17. Gearbox having
a tooth carrier for receiving teeth of a gear ring that are disposed about a rotation axis of the gearbox, wherein the teeth are disposed in the tooth carrier so as to be displaceable and guided in the radial direction, a cam disk which is rotatable about the rotation axis and for driving the teeth in the radial direction and which has a cam curvature that is variable over the circumference, wherein bearing segments which are mounted so as to slide on the cam disk are disposed between the teeth and the cam disk, and wherein the bearing segments have a contact region which has a concave curvature and is disposed so as to be centric on a running surface that faces the cam disk, wherein the concave curvature is larger than the smallest cam curvature of the cam disk and smaller than the largest cam curvature of the cam disk, and wherein the running surface of the bearing segments in a peripheral region of the running surface is in each case curved convexly in the circumferential direction.

\* \* \* \* \*